Figure 1:
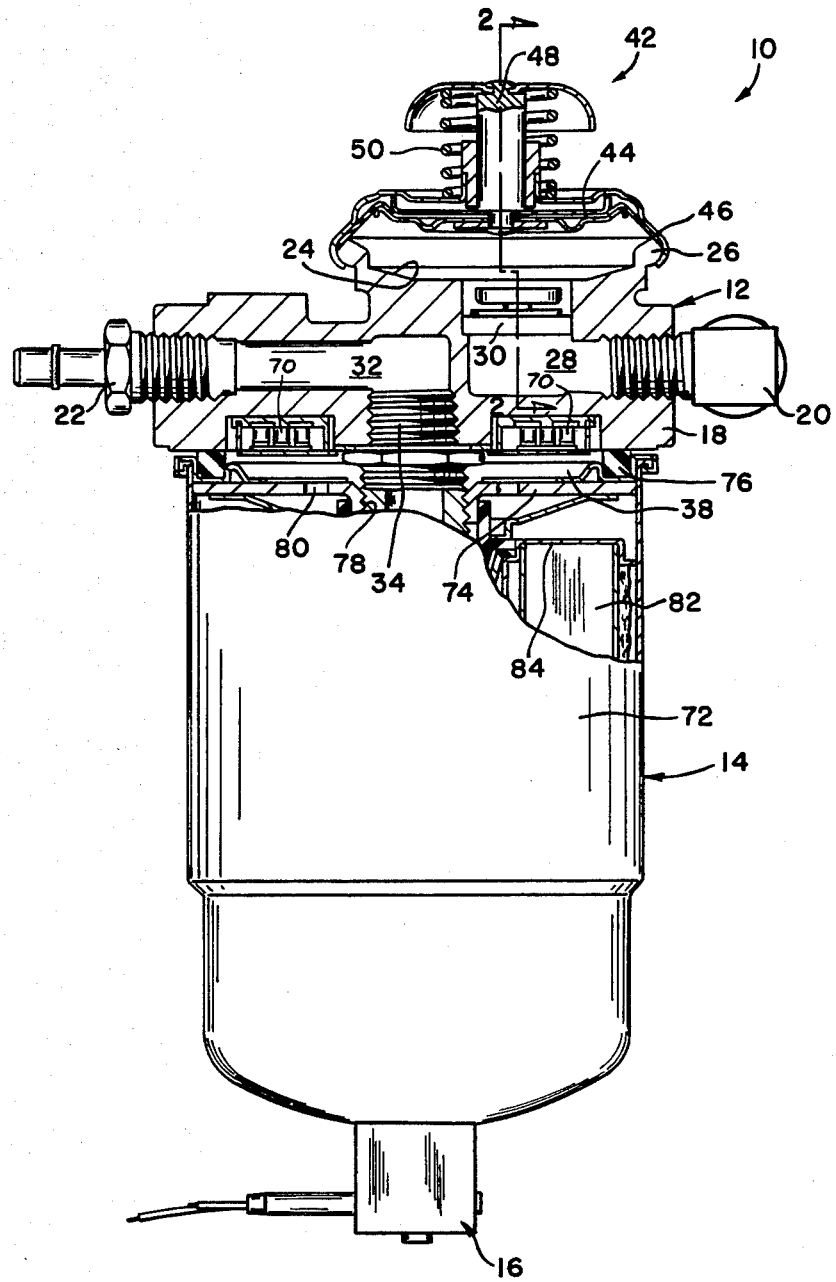

United States Patent [19]

Thornton et al.

[11] Patent Number: 4,500,425
[45] Date of Patent: Feb. 19, 1985

[54] PUMP VALVE FOR LIQUID SEPARATOR

[75] Inventors: Donald I. Thornton, Warwick, R.I.; Richard H. Peyton, Berkley, Mass.

[73] Assignee: Allied Corporation, Morristown, N.J.

[21] Appl. No.: 620,215

[22] Filed: Jun. 13, 1984

[51] Int. Cl.³ .............................................. B01D 27/00
[52] U.S. Cl. .................... 210/136; 210/311; 210/313; 210/416.4; 210/418; 210/DIG. 5; 123/557
[58] Field of Search .......................... 210/86, 130–133, 210/136, 137, 180, 184, 303, 311, 312, 313, 416.4, 418, 420, DIG. 5; 123/187.5 R, 196 A, 557, 558

[56] References Cited

U.S. PATENT DOCUMENTS

| 3,389,801 | 6/1968 | Sieger ................................. 210/136 |
| 3,809,244 | 5/1974 | Jackson ............................... 210/136 |
| 4,276,161 | 6/1981 | Matsui ..................................... 210/86 |
| 4,321,136 | 3/1982 | Matsui ..................................... 210/86 |
| 4,437,986 | 3/1984 | Hutchin ........................... 210/416.4 |

Primary Examiner—Ernest G. Therkorn
Attorney, Agent, or Firm—Ken C. Decker; William N. Antonis

[57] ABSTRACT

A separating device for removing water from a fuel oil/water mixture includes a cartridge comprising a filtering media and a sump. The cartridge is installed on a mounting head, which includes a pump and a pair of check valves to permit fluid to be drained from the sump by operation of the pump. A bypass passage permits fluid to bypass the check valves during normal operation of the device, but a plunger closes the bypass passage to permit operation of the pump to move fluid through the device.

5 Claims, 2 Drawing Figures

PUMP VALVE FOR LIQUID SEPARATOR

This invention relates to a separating device for separating the liquid components of a liquid mixture, and is particularly useful for removing water and other contaminants from the fuel oil in a diesel engine fuel supply system.

Reference is made to U.S. Pat. No. 4,437,986 (Hutchins et al), which discloses a separating device for removing entrained water and other contaminants from the fuel oil in a diesel engine fuel supply system. The device disclosed in the aforementioned patent includes a mounting head which is adapted to be secured to a fixed portion of a motor vehicle, and a removable cartridge which is carried on the mounting head and which contains a separating medium and a sump. Diesel fuel oil is communicated through the mounting head into the canister, and then passed through the filtering media where the entrained water is removed and collects in the sump. A hand-operated pump is carried on the mounting head upstream from the canister and is used to force fuel oil into the canister when the sump is drained in order to force water that has collected in the sump out of the canister.

The pumping mechanism includes a pair of check valves. The check valves operate properly if the fuel entering the unit is reasonably clean, but become clogged if the fuel contains large contaminants. As long as vehicle manufacturers use strainers in the fuel tanks, the fuel coming into the unit is reasonably clean. However, some manufacturers have begun manufacturing vehicles without strainers in the fuel tank, so that it cannot be guaranteed that large contaminants might not be entrained in the fuel being communicated to the unit. Since all of the fuel must pass through both of the check valves of the prior art pumping mechanism, and since the pumping mechanism is located on the upstream or inlet side of the unit, it is possible that fuel containing large contaminants may permanently damage the check valves. If this occurs, the check valves cannot readily be replaced, and the whole unit must be scrapped.

The present invention provides a fuel oil/water separator with a hand-operated pump on the upstream side of the unit to enable the sump to be drained by pumping the water out of its while also permitting the unit to be used in fuel systems which are not equipped with strainers in the fuel tank. The present invention comprises a bypass passage around the aforementioned check valves in the pumping mechanism, and a manually-operated plunger which can be operated to close the bypass passage when the pump is operated. Accordingly, fuel does not pass through the check valves during normal operation of the unit, so that the check valves cannot become clogged when the unit is operating normally.

Figure 2:
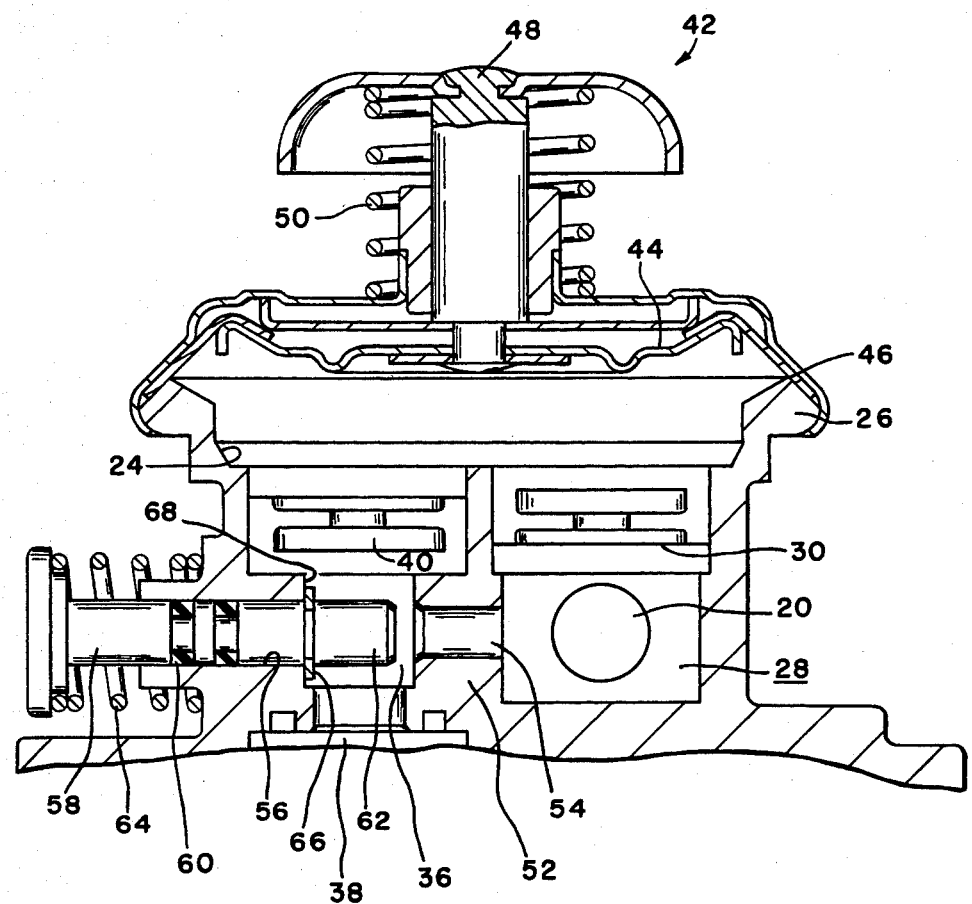

With respect to the drawings:

FIG. 1 is an elevational view, partly in section, of a separating device made pursuant to the teachings of our present invention; and FIG. 2 is a view taken substantially along lines 2—2 of FIG. 1.

Referring now to the drawings, a fuel oil/water separator generally indicated by the numeral 10 includes a mounting head generally indicated by the numeral 12 and a separating cartridge 14 which is removably mounted on the head 12. A sump drain and probe 16 are installed on the lower most portion of the cartridge 14. The cartridge 14 and the sump drain and probe 16 are fully described in the aforementioned U.S. Pat. No. 4,437,986 and will not be described in detail herein. The mounting head 12 includes a housing 18 which is fitted with an inlet port 20 and with an outlet port 22. The inlet port or fitting 20 is communicated to, for example, the vehicle fuel tank, and the outlet port or fitting 22 is communicated with, for example, the diesel engine fuel injectors. The housing 18 includes a dished portion 24 defined by a circumferentially extending rim 26. An inlet passage 28 communicates the inlet port 20 with the dished portion 24 and includes a one-way check valve 30 which permits fluid communication from the inlet port 20 into the dished portion 24, but prevents communication in the reverse direction. Similarly, the outlet port 22 communicates with an outlet passage 32 defined within the housing 12. Outlet passage 32 communicates with an annular threaded stud 34, which communicates with the separating cartridge 14, as will be hereinafter described. An intermediate passage generally indicated by the numeral 36 communicates the dished portion 24 with an intermediate chamber 38, which communicates with the upstream side of the filtering media within the separating cartridge 14 in a manner to be hereinafter described. A one-way check valve assembly 40 permits communication from the dished portion 24 into the passage 36, but prevents communication in the reverse direction.

A pumping mechanism generally indicated by the numeral 42 includes a diaphragm 44, the peripheral edge of which is clamped to the rim 26 by a metallic retainer 46. A plunger 48 is secured to the diaphragm 44 for operating the latter as will be hereinafter described. A spring 50 urges the plunger 48 upwardly viewing the figures, to the position illustrated.

The housing 18 includes an interior wall 52 which separates the inlet passage 28 from the intermediate passage 6. A bypass passage 54 extends through the wall 52 to communicate the passages 36, 28. Housing 18 further defines a bore 56 therein which slidably receives a plunger 58. The plunger 58 is provided with double seals 60 to seal against fluid leakage in the bore 56. Plunger 58 terminates in a reduced diameter end 62 which is adapted to sealingly engage the passage 54 to thereby terminate fluid communication between the passages 28, 36 through the bypass passage 54 when the end 62 of the plunger 58 is held in a position closing the bypass passage 54. A spring 64 yieldably urges the plunger 58 outwardly viewing FIG. 2, away from the bypass passage 54. A stop ring 66 is carried on the plunger 58 to define a stop for the plunger by engagement with the shoulder 68 on the housing. Accordingly, the spring 64 biases the stop ring 66 into engagement with the shoulder 68. A pair of heating elements 70 is carried in the housing 18 for heating the fluid pumped therethrough, as is more fully described in the aforementioned U.S. Pat. No. 4,437,986.

As also described in the aforementioned U.S. Pat. No. 4,437,986, the separating cartridge 14 includes an outer metal shell 72 which is closed by a metal tapping plate 74. The tapping plate 74 carries a circumferentially extending seal 76 which seals against the housing 18 when the threaded opening 78 in the tapping plate is screwed on the threaded stud 34 to install the cartridge 14 on the mounting head 12. Liquid in the intermediate chamber 38 is communicated into the cartridge 14 through circumferentially spaced openings 80 in the tapping plate 74. A filtering media 82 circumscribes the openings 80, and is closed by end cap 84. Fluid is communicated through the openings 80 into the chamber defined between the shell 72 and the filtering media 82, where it communicates through the filtering media 82 and then through the threaded stud 34 into the outlet passage 32. Water and other contaminants are removed by the filtering media 82 as more fully described in the aforementioned U.S. Pat. No. 4,437,986.

In operation, fluid is communicated through the inlet port 20, into the inlet passage 28, and through the bypass passage 54 into the intermediate passage 36. From the intermediate passage 36, fluid is communicated into the separating cartridge 14 through the intermediate chamber 38 and the openings 80. Fluid is communicated through the separating cartridge as described hereinabove and through the stud 34 into the pasage 32. Fluid can then be communicated from the passage 32 through the outlet port 22 and to the vehicle engine. It will be noted that, because of the bypass passage 54, the check valves 30, 40 are bypassed during normal operation of the unit. Accordingly, even if relatively large contaminants are entrained in the fuel communicated through the inlet port 20, neither the pumping mechanism 42 nor the check valves 30, 40 will be affected, since the fluid flow bypasses these components because of the bypass passage 54. These relatively large contaminants will, of course, be removed from the liquid by the filtering medium 82, so that the fluid communicated from the outlet port 22 will be substantially free of contaminants.

As explained hereinabove, the sump contained within the cartridge 14 will eventually fill and must be drained. Fluid is expelled through the drain mechanism 16 as described in the aforementioned U.S. Pat. No. 4,437,986. Removal of the water is expedited by operation of the pump 42. When the sump is to be drained, the drain assembly 16 is opened, and the plunger 58 is forced inwardly viewing FIG. 2 to close the bypass passage 54 to thereby prevent communication between the inlet passage 28 and the intermediate passage 36. While the plunger 58 is being held in a position closing the bypass passage 54, the plunger 48 is operated to force the diaphragm 44 toward the check valves 30, 40. As the spring 50 moves the plunger 48 and diaphragm 44 away from the check valves 30, 40, fluid in the inlet passage 28 is communicated through the check valve 30 into the dished portion 24. As the plunger 48 is then forced toward the check valves 30, 40, fluid is then expelled into the intermediate passage 36 through the check valve 40. Of course, as fluid is being forced through the check valve 40, the check valve 30 prevents fluid from being forced back into the inlet passage 28, and when fluid is being drawn through the check valve 30 from the passage 28, the check valve 40 prevents fluid from being drawn back into the dished portion 24 from the intermediate passage 36. When the sump is drained, the plunger 58 is released, so that the spring 64 returns the plunger to the position defined in the drawing wherein the stop ring 66 is brought into engagement with the shoulder 68, thereby opening the bypass passage 54 to again permit fluid to bypass the check valves 30, 40 and to communicate directly from the inlet passage 28 into the intermediate passage 36.

We claim:

1. Separating device for a liquid flow system for removing material entrained in the liquid flowing through the system comprising a mounting head and a cartridge mounted on said mounting head, said cartridge containing at least one filtering medium for removing at least some of the material entrained in said liquid, said mounting head including an inlet and an outlet for connection with said liquid flow system, an inlet cavity communicated with said inlet, an intermediate cavity communicated with the upstream side of said filtering medium, said outlet being communicated with the downstream side of said filtering medium, a pumping chamber communicating with both said inlet and intermediate cavities, one-way check valve means permitting liquid communication from the inlet cavity into the pumping cavity and from the pumping cavity into the intermediate cavity but preventing communication in the opposite direction, manually-operated pumping means for forcing liquid from said inlet cavity into the pumping cavity and from said pumping cavity into said intermediate cavity, a bypass passage communicating the inlet with the intermediate cavity and bypassing said pumping cavity and said check valve means, and manually-operable means for closing said bypass passage when said pumping means is operated.

2. Separating device as claimed in claim 1, wherein said means for closing said bypass passage is a plunger slidably mounted in said head and movable toward and away from a position closing said bypass passage.

3. Separating device as claimed in claim 2, wherein said means for closing said bypass passage further includes a spring yieldably urging said plunger away from the bypass passage.

4. Separating device as claimed in claim 3, wherein said means for closing said bypass passage further includes a bore defined within said head slidably receiving said plunger, said inlet cavity and said bypass passage communicating with said bore, said plunger having a valve seating area adapted to engage said bypass passage to close the latter.

5. Separating device as claimed in claim 4, wherein a shoulder is defined on the wall of said bore and stop means is carried by said plunger for engagement with said shoulder, said spring urging said plunger toward a condition in which said stop means engages said shoulder, said bypass passage being open when the plunger is in said condition.

* * * * *